United States Patent
Herron et al.

(10) Patent No.: US 12,048,903 B2
(45) Date of Patent: Jul. 30, 2024

(54) THIN FILMS COVALENTLY BONDED TO CELLULOSE ESTER MEMBRANES AND METHODS OF MAKING THE SAME

(71) Applicant: FLUID TECHNOLOGY SOLUTIONS (FTS), INC., Albany, OR (US)

(72) Inventors: John Herron, Albany, OR (US); Edward Gerard Beaudry, Albany, OR (US)

(73) Assignee: FLUID TECHNOLOGY SOLUTIONS (FTS), INC.

(*) Notice: Subject to any disclaimer, the term of this patent is extended or adjusted under 35 U.S.C. 154(b) by 903 days.

(21) Appl. No.: 16/330,602

(22) PCT Filed: Sep. 11, 2017

(86) PCT No.: PCT/US2017/050987
§ 371 (c)(1),
(2) Date: Mar. 5, 2019

(87) PCT Pub. No.: WO2018/049341
PCT Pub. Date: Mar. 15, 2018

(65) Prior Publication Data
US 2021/0283555 A1 Sep. 16, 2021

Related U.S. Application Data
(60) Provisional application No. 62/393,595, filed on Sep. 12, 2016.

(51) Int. Cl.
*B01D 69/12* (2006.01)
*B01D 63/10* (2006.01)
(Continued)

(52) U.S. Cl.
CPC ....... *B01D 69/1251* (2022.08); *B01D 63/101* (2022.08); *B01D 67/0006* (2013.01);
(Continued)

(58) Field of Classification Search
CPC .. B01D 2323/30; B01D 69/02; B01D 69/125; B01D 71/56; B01D 67/0006;
(Continued)

(56) References Cited

U.S. PATENT DOCUMENTS 4,277,344 A * 7/1981 Cadotte ............. B01D 71/56
 210/654
4,861,628 A 8/1989 Schucker
(Continued)

FOREIGN PATENT DOCUMENTS

CN 102824855 A 12/2012
WO 2015116508 A1 8/2015
(Continued)

OTHER PUBLICATIONS

Alsvik, et al., "Polyamide Formation on a Cellulose Triacetate Support for Osmotic Membranes: Effect of Linking Molecules on Membrane Performance", Destination 312, 2013, pp. 2-9.
(Continued)

*Primary Examiner* — Claire A Norris
(74) *Attorney, Agent, or Firm* — Dorsey & Whitney LLP (57) ABSTRACT

Embodiments disclosed herein are directed to membranes for filtration, methods of manufacturing the same, and membrane modules incorporating the same. In an embodiment, a membrane is disclosed. The membrane includes a porous cellulose layer, a polyamide thin film layer bonded to the porous cellulose layer, and a fabric support layer that supports the porous cellulose layer and the polyamide thin
(Continued)

film layer. The porous cellulose layer has a pore size of about 30 nm to about 500 nm at an exposed surface of the porous cellulose layer.

38 Claims, 8 Drawing Sheets

(51) Int. Cl.
    *B01D 67/00*      (2006.01)
    *B01D 69/02*      (2006.01)
    *B01D 71/14*      (2006.01)
    *B01D 71/56*      (2006.01)
    *C08J 5/18*      (2006.01)

(52) U.S. Cl.
    CPC ............. *B01D 69/02* (2013.01); *B01D 71/14* (2013.01); *B01D 71/56* (2013.01); *C08J 5/18* (2013.01); *B01D 2323/30* (2013.01); *B01D 2325/04* (2013.01); *C08J 2301/10* (2013.01); *C08J 2377/06* (2013.01)

(58) Field of Classification Search
    CPC ...... B01D 69/105; B01D 71/14; B01D 71/16; B01D 2325/04; B01D 2325/20; B01D 63/10; B01D 63/101; B01D 69/1251; C08J 2301/10; C08J 2377/06; C08J 5/18
    See application file for complete search history.

(56) References Cited

U.S. PATENT DOCUMENTS

| | | |
|---|---|---|
| 5,879,752 A | 3/1999 | Murakami et al. |
| 2003/0116498 A1 | 6/2003 | Mickols et al. |
| 2007/0272628 A1* | 11/2007 | Mickols ............... B01D 61/027 210/336 |
| 2009/0078640 A1* | 3/2009 | Chu ....................... B01D 71/12 210/490 |
| 2010/0224555 A1* | 9/2010 | Hoek ................... B01D 69/125 427/322 |
| 2011/0004018 A1* | 1/2011 | Ito .......................... C07C 209/84 564/138 |
| 2011/0027599 A1* | 2/2011 | Hoek ................. B01D 67/0079 428/476.3 |
| 2011/0226695 A1* | 9/2011 | Taniguchi ............ B01D 61/026 210/639 |
| 2012/0048799 A1* | 3/2012 | Na .......................... B01D 71/40 427/244 |
| 2012/0312737 A1* | 12/2012 | Miller .................... B01D 71/10 210/500.25 |
| 2013/0112618 A1* | 5/2013 | Diallo .................... B01D 69/12 210/500.33 |
| 2014/0183127 A1 | 7/2014 | Nakatsuji et al. |
| 2014/0251892 A1 | 9/2014 | Lee et al. |
| 2015/0083660 A1 | 3/2015 | Kim et al. |
| 2015/0108061 A1* | 4/2015 | Chi ....................... B01D 69/125 427/244 |
| 2019/0022602 A1* | 1/2019 | Tokuyama ............ B32B 27/286 |
| 2020/0261855 A1* | 8/2020 | McVerry ................ B01D 71/28 |

FOREIGN PATENT DOCUMENTS

| | | |
|---|---|---|
| WO | 2017053709 A1 | 3/2017 |
| WO | 2017079131 A1 | 5/2017 |

OTHER PUBLICATIONS

International Search Report for International Application No. PCT/US2017/050987 mailed Nov. 22, 2017.
U.S. Appl. No. 62/393,595, filed Sep. 12, 2016.
Alsvik, et al., "Polyamide formation on a cellulose triactate support for osmotic membranes: Effect of linking molecules on membrane performance", Desalination, vol. 31, 2013, pp. 2-9.

* cited by examiner

FIG.6

US 12,048,903 B2

THIN FILMS COVALENTLY BONDED TO CELLULOSE ESTER MEMBRANES AND METHODS OF MAKING THE SAME

CROSS-REFERENCE TO RELATED APPLICATIONS

This application claims priority to U.S. Provisional Application 62/393,595 filed on 12 Sep. 2016, the disclosure of which is incorporated herein, in its entirety, by this reference.

BACKGROUND

High performing filtration membranes, such as for forward or reverse osmosis, include a highly permeable dense layer and a porous layer having low diffusional resistance. Materials for constructing such membranes include cellulose acetate porous layers, although their flux may be impeded by relatively high permeation resistance in the dense layer. Thin film composite membranes may have higher fluxes but also higher diffusional resistance than cellulose acetate layers. Thin film composite membranes generally have not replicated the low diffusional resistance of cellulose acetate because of the challenges in adhering a polyamide dense layer to a porous layer having a low diffusion resistance.

Polyamide layers can be formed by interfacial polymerization between an aqueous amine solution and a reactive organic solution. The polyamide layer is not initially bonded to the porous support, but the formation of hydrogen bonds between the two layers during a baking process helps improve adhesion. Without covalent bonds between layers, thin film composite membranes remain delicate and easily damaged.

In one approach to covalently bonding a polyamide layer to a cellulose acetate porous layer, a multi-functional acid chloride in an apriotic solvent is added to a cellulose acetate sheet and the acid crosslinks to available hydroxyl groups in the cellulose acetate. A multi-functional amine monomer is then added and the amine crosslinks to acid chloride sites on the cellulose acetate layer. During subsequent interfacial polymerization, the developing polyamide layer crosslinks to the modified cellulose acetate to form a polyamide layer covalently bonded to the porous support. In this approach, the acid chloride is crosslinked throughout the cellulose acetate layer, not exclusively on the surface. When the multi-functional amine is introduced, the amine groups bond to acid chloride sites inside the layer as well as on the surface. Crosslinking inside the porous support leads to the formation of membrane vulnerabilities, such as large pores and macrovoids. Macrovoids produce flaws in the polyamide layer and a dramatic drop in membrane rejection.

Accordingly, users and manufacturers of filtration membranes continue to seek improvements thereto.

SUMMARY

Embodiments disclosed herein are directed to membranes for filtration, methods of manufacturing the same, and membrane modules incorporating the same. In an embodiment, a membrane is disclosed. The membrane includes a porous cellulose layer, a polyamide thin film layer bonded to the porous cellulose layer, and a fabric support layer that supports the porous cellulose layer and the polyamide thin film layer. The porous cellulose layer has a pore size of about 30 nm to about 500 nm at an exposed surface of the porous cellulose layer.

In an embodiment, a method of manufacturing a membrane is disclosed. A cellulose ester sheet is provided. The cellulose ester sheet is contacted with a first solution including an acid/amine cross-linker. The cellulose ester sheet is also contacted with a second solution including a multifunctional amine. The cellulose ester sheet is also contacted with a third solution including an acyl halide. Interfacial polymerization occurs at least in part between amine sites on a surface of the cellulose ester sheet and the acyl halide. Interfacial polymerization produces a polyamide layer covalently bonded to the cellulose ester sheet.

In another embodiment, a method of manufacturing a membrane is disclosed. A cellulose ester sheet is provided. The cellulose ester sheet is contacted with a first solution including an acid/amine cross-linker and a multifunctional amine. The cellulose ester sheet is also contacted with a second solution including an acyl halide. Interfacial polymerization occurs at least in part between amine sites on a surface of the cellulose ester sheet and the acyl halide. Interfacial polymerization produces a polyamide layer covalently bonded to the cellulose ester sheet.

In an embodiment, a membrane module is disclosed. The module includes a tube and a membrane sheet spirally wound around the tube. The membrane sheet includes a porous cellulose layer, a polyamide thin film layer bonded to the porous cellulose layer, and a fabric support layer that supports the porous cellulose layer and the polyamide thin film layer. The porous cellulose layer has a pore size of about 30 nm to about 500 nm at an exposed surface of the porous cellulose layer.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical elements or features in different views or embodiments shown in the drawings.

DETAILED DESCRIPTION

Embodiments disclosed herein are directed to membranes for filtration applications including reverse osmosis, forward osmosis, nanofiltration, pressure-assisted forward osmosis, and pressure-retarded osmosis. Methods of manufacturing the membranes are also provided, as are membrane modules incorporating the membranes. The membranes and membrane modules disclosed herein may be used in any application for which existing filtration membranes are used, such as concentration of industrial or agricultural waste by forward osmosis or power generation by the pressure-retarded osmosis mixing of waters with different salinities.

The membranes disclosed herein include a porous cellulose layer, a polyamide thin film layer, and fabric support layer. The polyamide thin film layer may be covalently bonded to the surface of the porous cellulose layer. By covalently bonding the two layers, the strength and durability of the membrane may be increased, delamination between layers may be decreased, and the formation of macrovoids may be decreased. Esterification of the cellulose layer with multi-functional organic acids such that reactive carboxyl groups remain may permit the covalent bonding. In some methods of making the membranes, thin polyamide layers are covalently bonded to high-diffusion cellulose membranes. Covalently bonding the polyamide thin film layer to the porous cellulose layer reduces the number of steps to manufacture the membranes.

Membranes

Figure 1:
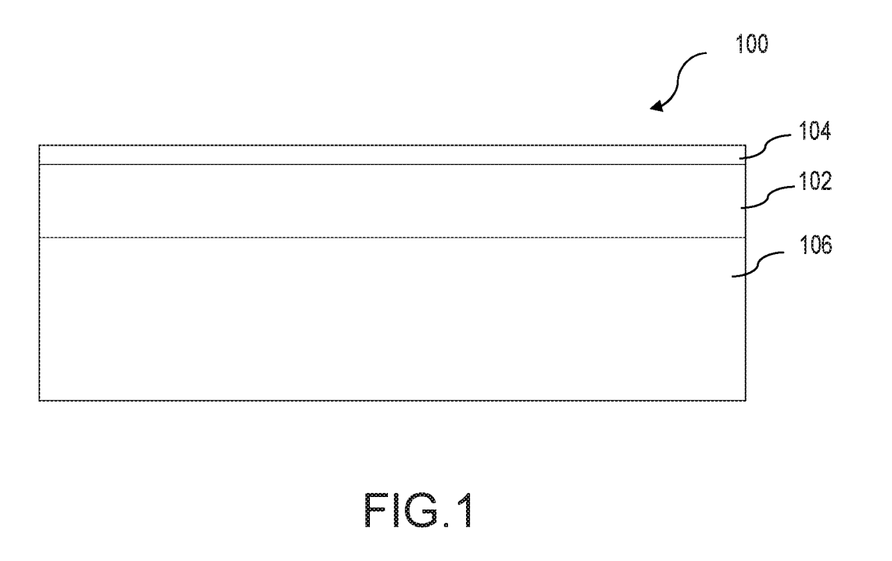
FIG. 1 is a schematic side view of a membrane, according to an embodiment.

FIG. 1 is a schematic side view of a membrane 100 according to an embodiment. The membrane 100 includes a porous cellulose layer 102, a polyamide thin film layer 104, and a fabric support layer 106. The fabric support layer 106 provides structure or mechanical strength to each of the porous cellulose layer 102 and the polyamide thin film layer 104. The fabric support layer 106 may have a thickness of 100 μm or less and may have 25% or more open area. The fabric support layer 106 may be formed from a fabric portion embedded in a support portion. The fabric portion may be constructed of a non-woven fabric or a thin, open, woven screen. The support portion may be constructed of a plastic, such as polyester.

The porous cellulose layer 102 provides mechanical support to the polyamide thin film layer 104 and permits water to pass through relatively easily. The porous cellulose layer 102 may have a thickness of 175 μm or less.

The porous cellulose layer 102 includes cellulose polymers, which are at least in part polymers of cellulose and ester (cellulose-ester) repeating groups. The term "ester," as used herein, means a functional group (also referred to as a "group") having the formula RC(O)OR', wherein R' can be a carbon group, which may be or may include a carboxyl group. R' can also be hydrogen such that the ester group can be a carboxyl (carboxylic acid) group. Each cellulose unit includes three free hydroxyl groups and one, two, or three of the hydroxyl groups per a given unit may be substituted with an ester group.

The porous cellulose layer 102 includes at least two different types of cellulose-ester repeating groups: a first type having all of its ester groups, which may be one, two, or three ester groups, derived from carboxylic acids having one carboxylic acid group, and a second type having at least one ester of a carboxylic acid having at least two carboxylic acid groups. The cellulose-ester repeating groups may be esterified from singly- or multi-functional carboxylic acids.

The first type of cellulose-ester repeating group includes, and the second type of cellulose-ester repeating group may include, at least one ester group that is the ester of a carboxylic acid having one carboxylic acid group. The carboxylic acid having one carboxylic acid group may include, for example, acetic (ethanoic) acid, propionic (propanoic) acid, butyric (butanoic) acid, pentanoic acid, hexanoic acid, heptanoic acid, octanoic acid, nonanoic acid, and decanoic acid.

Cellulose-ester repeating groups derived from the esters of carboxylic acids having one carboxylic acid group may include esters derived from exclusively singly functional carboxylic acids, which may be the same or different carboxylic acids. These cellulose-ester repeating groups may include, for example, cellulose-acetate, cellulose-diacetate, cellulose-triacetate, cellulose-propionate, cellulose-dipropionate, cellulose-tripropionate, and cellulose-diacetate-propionate.

When a hydroxyl group of cellulose reacts with a carboxyl group of, for example, acetic acid, an acetate ester is produced and no free ester (carboxyl group) is present on the cellulose-acetate repeating group. Examples of cellulose-acetate repeating groups are shown below, in which * represents a point of attachment of another group:

cellulose-acetate cellulose-diacetate cellulose-triacetate

In at least some of the cellulose-ester repeating groups of the presently described porous cellulose layer 102, such as the second type of cellulose-ester repeating groups, at least one ester group is the ester of a carboxylic acid having at least two carboxylic acid functional groups. The carboxylic acid having at least two carboxylic acid groups may include, for example, malonic (propanedioic) acid, butanedioic acid, pentanedioic acid, hexanedioic acid, heptanedioic acid, octanedioic acid, nonanedioic acid, decanedioic acid, (E)-butenedioic acid, pent-2-enedioic acid, malic (hydroxybutanedioic) acid, tartronic (2-hydroxypropanedioic) acid, tartaric (2,3-dihydroxybutanedioic) acid, aspartic (2-aminobutanedioic) acid, and glutamic (2-aminopentanedioic) acid.

Cellulose-ester repeating groups having at least one ester of a carboxylic acid having at least two carboxylic acid groups may include ester groups derived from the same or different singly- or multifunctional carboxylic acids. These cellulose-ester repeating groups may include, for example, cellulose-malonate, cellulose-dimalonate, cellulose-trimalonate, cellulose-malate, cellulose-dimalate, cellulose-trimalate, cellulose-malonate-malate, cellulose-acetate-malonate, cellulose-diacetate-malonate, cellulose-acetate-malate, and cellulose-diacetate-malate.

When a hydroxyl group of cellulose reacts with a carboxyl group of, for example, malic acid, a malate ester is produced and one free ester (carboxyl group) is present on the cellulose-malate repeating group. Each of a cellulose-acetate-malate and a cellulose-acetate-malonate repeating group is shown below, in which * represents a point of attachment of another repeating group:

cellulose-acetate-malate cellulose-acetate-malonate

Prior to assembly of the membrane 100, at least some of the free ester (carboxyl) groups are positioned on a side of the porous cellulose layer 102 that will ultimately face the polyamide thin film layer 104. In the assembled membrane 100, at least one of the free ester groups remains unreacted and is positioned at an interface between the porous cellulose layer 102 and the polyamide thin film layer 104.

More of the first type of cellulose-ester repeating groups, which has all of its ester groups derived from carboxylic acids having one carboxylic acid group, are present in the porous cellulose layer 102 than the second type of cellulose-ester repeating groups, which has at least one ester of a carboxylic acid having at least two carboxylic acid groups. The ratio of the first type to the second type may be about 50:1 to about 5:1, about 45:1 to about 5:1, about 40:1 to about 5:1, about 35:1 to about 5:1, about 30:1 to about 5:1, about 25:1 to about 5:1, about 20:1 to about 5:1, about 50:1 to about 10:1, about 50:1 to about 15:1, about 50:1 to about 20:1, about 50:1 to about 25:1, about 50:1 to about 30:1. In some embodiments, the ratio of the first type of cellulose-ester repeating groups to the second type cellulose-ester repeating groups is about 40:1 to about 20:1 or about 30:1.

The average size of pores of the porous cellulose layer 102 may vary throughout the layer. In an embodiment, the average pore size increases from the exposed surface of the porous cellulose layer 102 towards the fabric support layer 106. The average pore size at the exposed surface of the porous cellulose layer 102 may be from about 30 nm to about 500 nm, from about 40 nm to about 500 nm, from about 50 nm to about 500 nm, from about 75 nm to about 500 nm, from about 100 nm to about 500 nm, from about 150 nm to about 500 nm, from about 200 nm to about 500 nm, from about 250 nm to about 500 nm, from about 300 nm to about 500 nm, from about 30 nm to about 475 nm, from about 30 nm to about 450 nm, from about 30 nm to about 425 nm, from about 30 nm to about 400 nm, from about 30 nm to about 350 nm, from about 30 nm to about 300 nm, from about 30 nm to about 250 nm, from about 30 nm to about 200 nm, or from about 20 nm to about 100 nm.

The average pore size at the at the interface between the porous cellulose layer 102 and the fabric support layer 106 may be from about 30 nm to about 2 μm (2000 nm), from about 50 nm to about 2000 nm, from about 75 nm to about 2000 nm, from about 100 nm to about 2000 nm, from about 200 nm to about 2000 nm, from about 300 nm to about 2000 nm, from about 400 nm to about 2000 nm, from about 500 nm to about 2000 nm, from about 750 nm to about 2000 nm, from about 1000 nm to about 2000 nm, from about 1250 nm to about 2000 nm, from about 1500 nm to about 2000 nm, from about 30 nm to about 2000 nm, from about 30 nm to about 1900 nm, from about 30 nm to about 1800 nm, from about 30 nm to about 1700 nm, from about 30 nm to about 1600 nm, from about 30 nm to about 1500 nm, from about 30 nm to about 1250 nm, from about 30 nm to about 1000 nm, from about 30 nm to about 750 nm, from about 30 nm to about 500 nm, from about 30 nm to about 250 nm, or from about 30 nm to about 200 nm.

With reference again to FIG. 1 the polyamide thin film layer 104, also referred to as a dense, rejection, or selective layer, permits the passage of water exclusively or almost exclusively. The polyamide thin film layer 104 is designed to withstand high osmotic pressures, such as up to 1000 psi on one side of the layer and 0 psi on the other side of the layer.

The polyamide thin film layer 104 may have a thickness of about 10 nm to about 300 nm, about 20 nm to about 300 nm, about 30 nm to about 300 nm, about 40 nm to about 300 nm, about 50 nm to about 300 nm, about 60 nm to about 300 nm, about 70 nm to about 300 nm, about 80 nm to about 300 nm, about 90 nm to about 300 nm, about 100 nm to about 300 nm, about 10 nm to about 275 nm, about 10 nm to about 250 nm, about 10 nm to about 225 nm, about 10 nm to about 200 nm, about 10 nm to about 175 nm, about 10 nm to about 150 nm, about 10 nm to about 125 nm, about 10 nm to about 100 nm, about 15 nm to about 200 nm, or about 20 nm to about 200 nm.

The polyamide thin film layer 104 is formed by an interfacial polymerization reaction between an amine functional group and a terminal carbonyl moiety. In one example, the amine functional group is a primary amine group, such as in m-phenylenediamine or p-phenylenediamine, and the carbonyl group is from an acyl halide group, such as in the acid chloride 1,3,5-trimesoyl chloride (also referred to as TMC or 1,3,5-benzenetricarbonyl trichloride).

In some of the amine-carbonyl condensation reactions, the amine group is covalently bonded to the surface of the porous cellulose layer 102. In such reactions, the polymerized amine and acyl halide, and thereby the polyamide thin film layer 104, is covalently bonded to the porous cellulose layer 102. Any two covalent bonds may be formed less than about 60 nm apart, less than about 50 nm apart, less than about 40 nm apart, less than about 30 nm apart, less than about 20 nm apart, less than about 10 nm apart, about 5 nm to about 60 nm apart, about 10 nm to about 50 nm apart, about 20 nm to about 50 nm apart, or about 20 nm apart.

Covalent bonding the polyamide thin film layer 104 to the surface of the porous cellulose layer 102 provides mechanical strength to the membrane 100 and helps the membrane 100 resist delamination. Covalent bonding between reactive groups at the surface of the porous cellulose layer 102, rather than within the porous cellulose layer 102, reduces or avoids the formation of macrovoids. Macrovoids may form when a saline solution, such as a draw solution, is introduced to a membrane 100. Macrovoids produce flaws in the polyamide thin film layer 104 as well as a dramatic drop in membrane rejection.

The membrane 100 or its component layers may meet certain performance thresholds. Performance metrics may include A value, the pure water permeability of the polyamide thin film layer 104; B value, the salt permeability of the polyamide thin film layer 104; and S value, the resistance of the porous cellulose layer 102 to solute diffusion.

The A value of the polyamide thin film layer 104 of the membrane 100 may be about 0.5 L/(m²·hr·bar) to about 2 L/(m²·hr·bar), about 1 L/(m²·hr·bar) to about 2 L/(m² hr·bar), about 1.5 L/(m² hr·bar) to about 2 L/(m² hr·bar), about 0.5 L/(m²·hr·bar) to about 1.5 L/(m²·hr·bar), or about 0.5 L/(m²·hr·bar) to about 1 L/(m²·hr·bar).

The B value of the polyamide thin film layer 104 of the membrane 100 may be about 0.05 L/(m²·hr) to about 0.2 L/(m²·hr), about 0.1 L/(m²·hr) to about 0.2 L/(m²·hr), about 0.15 L/(m²·hr) to about 0.2 L/(m²·hr), about 0.05 L/(m²·hr) to about 0.15 L/(m²·hr), or about 0.05 L/(m²·hr) to about 0.1 L/(m²·hr).

The S value of the porous cellulose layer 102 of the membrane 100 may be about 100 μm to about 400 μm, about 150 μm to about 400 μm, about 200 μm to about 400 μm, about 250 μm to about 400 μm, about 300 μm to about 400 μm, about 100 μm to about 350 μm, about 100 μm to about 300 μm, about 100 μm to about 250 μm, or about 100 μm to about 200 μm.

Methods of Making Membranes

Figure 2:
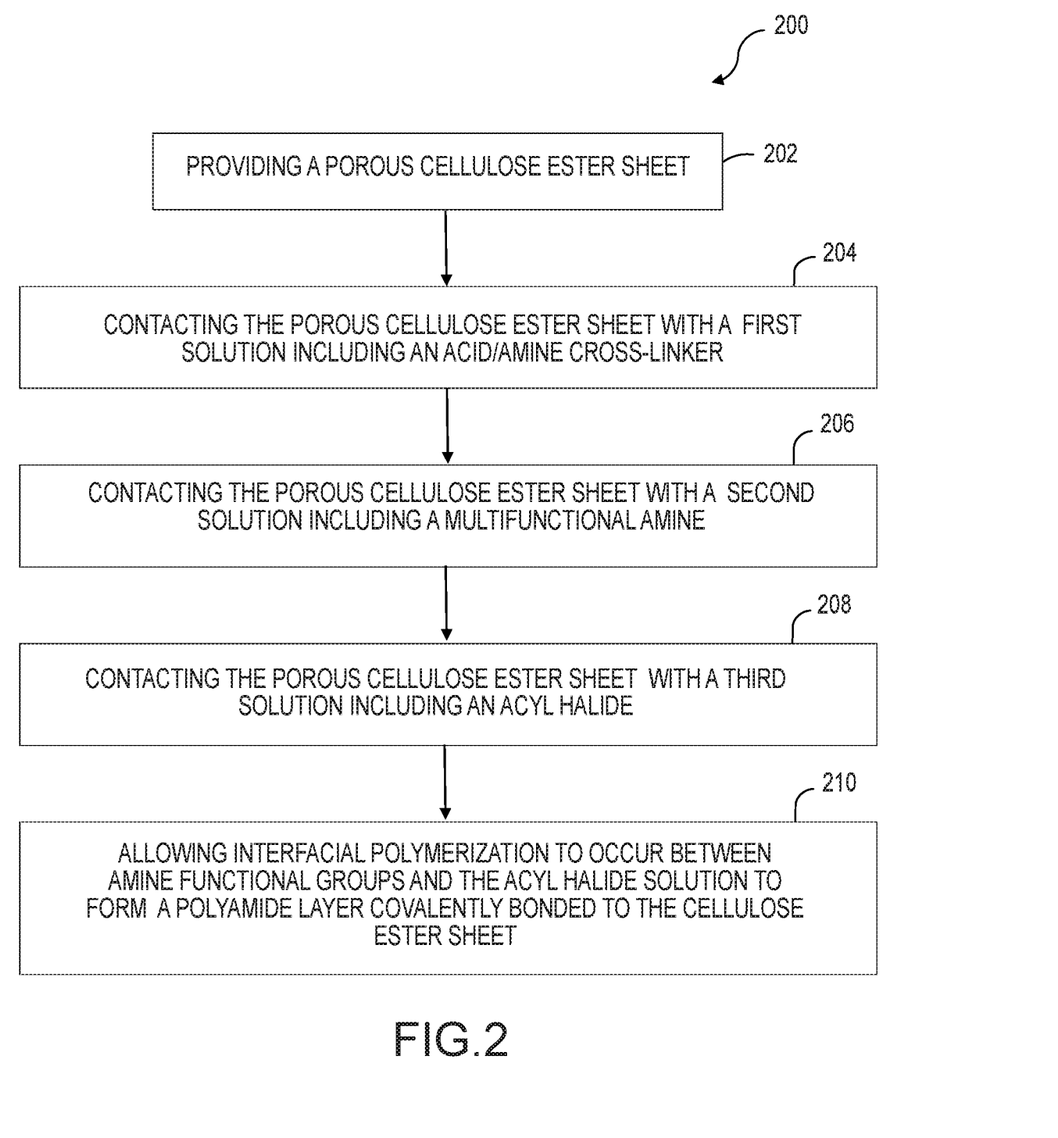
FIG. 2 is a flow chart illustrating a method of manufacturing the membrane of FIG. 1, according to an embodiment.

The membranes 100 disclosed herein may be formed by various methods. FIG. 2 is a flow chart illustrating a method 200 of manufacturing the membrane 100 of FIG. 1, according to an embodiment. The method 200 includes acts 202, 204, 206, 208, and 210, which will be discussed in more detail below.

Act 202 includes providing a porous cellulose sheet or layer 102. The layer 102 may be formed by a method known in the art, such as a phase inversion process. The porous cellulose layer 102 may be hydrated as part of the formation process or separate from the formation process.

Act 204 includes contacting the porous cellulose layer 102 with a first solution including an acid/amine cross-linker. The acid/amine cross-linker may be dicyclohexylcarbodiimide ("DCC"), which may be dissolved in an organic or hydrophobic solvent such as hexane or an isoparaffinic fluid (e.g., Isopar™, Exxon Mobil, Spring, TX). The DCC, or other acid/amine cross-linker, reacts with free ester groups, such as from malate residues, on the surface of the porous cellulose layer 102 to form acid-linker groups as shown in the reaction below:

Some to all of the free ester groups react with the acid/amine cross-linker to form acid-linker groups. The percentage of free ester groups that form acid-linker groups may be 5% to 100%, 10% to 100%, 20% to 100%, 30% to 100%, 40% to 100%, 50% to 100%, 60% to 100%, 70% to 100%, 80% to 100%, 5% to 90%, 5% to 80%, 5% to 70%, 5% to 60%, 5% to 50%, 5% to 40%, 5% to 30%, 5% to 20%, or 5% to 10%.

Act 204 may also include removing water from the surface of the porous cellulose layer 102 prior to contacting the layer 102 with the acid/amine cross-linker solution.

Act 206 includes contacting the porous cellulose layer 102 with a second solution including a multifunctional amine. The entire porous cellulose layer 102 may be immersed in the multifunctional amine solution. The multifunctional amine may be, for example, ethylenediamine, propylenediamine, tris(2-diaminoethyl)amine, m-phenylenediamine ("MPD"), p-phenylenediamine ("PPD"), 1,3,5-benzenetriamine, 1,3,4-benzenetriamine, 3,5-diaminobenzoic acid, 2,4-diaminotoluene, 2,4-diaminoanisole, xylylenediamine, and piperazine or derivatives thereof. The multifunctional amine may be dissolved in an aqueous solution.

The MPD, PPD, or other multifunctional amine, bonds with acid-linker groups formed in act 204 to form acid-amine sites on the surface of the porous cellulose layer 102 as shown in the reaction below:

Some of the multifunctional amine in solution soaks into the porous cellulose layer 102 without reacting and is available to participate in act 208. Act 206 may also include removing solvent from the surface of the porous cellulose layer 102 prior to contacting the layer 102 with the multifunctional amine solution.

Act 208 includes contacting the porous cellulose layer 102 with a third solution including an acyl halide. The acyl halide may be an acid chloride, such as 1,3,5-trimesoyl chloride ("TMC"), 5-isocyanatoisophthaloyl chloride, cyclohexane-1,3,5-tricarbonyl chloride, 3,3,5,5-biphenyl tetraacyl chloride, oxalyl chloride, succinyl chloride, glutaryl chloride, adipoyl chloride, fumaryl chloride, itaconyl chloride, 1,2-cyclobutanedicarboxylic acid chloride, isophthaloyl chloride, terephthaloyl chloride, 2,6-pyridinedicarbonyl chloride, biphenyl-4,4-dicarboxylic acid chloride, naphthalene-1,4-dicarboxylic acid chloride, and naphthalene-2,6-dicarboxylic acid chloride. The acyl halide may be dissolved in an organic solvent such as hexane or an isoparaffinic fluid (e.g., Isopar™, Exxon Mobil, Spring, TX).

Act 208 may also include removing water from the surface of the porous cellulose layer 102 prior to contacting the layer 102 with the acyl halide solution.

Act 210 includes allowing interfacial polymerization to occur between the amine functional groups and the carbonyl moieties of the acyl halide solution, such as via condensation reactions, to form a polyamide layer 104. The amine functional groups are in the acid-amines sites formed on the surface of the porous cellulose layer 102 in act 206 as well as in the multifunctional amine solution that diffuses from pores of the porous cellulose layer 102. Interfacial polymerization between the acyl halide solution and amine functional groups in the multifunctional amine solution produces the bulk of the polyamide layer 104. Interfacial polymerization between the acyl halide solution and amine groups covalently bonded to the surface of the porous cellulose layer 102 in turn covalently bonds the polyamide layer 104 to the surface of the porous cellulose layer 102.

In one example, TMC or other acyl halide bonds with acid-amines sites formed in act 206 as well as free multifunctional amine solution to form a polyamide layer 104 covalently bonded to the surface of the porous cellulose layer 102 as shown in the reaction below, in which * represents a point of attachment of another polymer:

In the method 200, it is not necessary to include an act of baking the membrane 100 as in known methods of forming membranes. Covalently bonding the polyamide layer 104 to the porous cellulose layer 102 provides mechanical strength to the membrane 100 and helps the membrane 100 resist delamination, even in the absence of baking.

In the method 200, interfacial polymerization occurs exclusively or almost exclusively at or near the surface of the porous cellulose layer 102. Interfacial polymerization does not occur, or occurs to a negligible extent, within the porous cellulose layer 102. The hydophobic acyl halide solution does not penetrate, or negligibly penetrates, the surface of the porous cellulose layer 102, which limits formation of the polymaide layer 104 to the surface of the porous cellulose layer 102. Interfacial polymerization can be a violent exothermic reaction, with temperatures exceeding 100° C., and such forceful reactions can weaken the membrane 100. Limiting or preventing interfacial polymerization below the surface limits or prevents the formation of membrane vulnerabilities such as large pores and macrovoids. Macrovoids may form when a saline solution, such as a draw solution, is introduced to a membrane 100. Macrovoids produce flaws in the polyamide thin film layer 104 as well as a dramatic drop in membrane rejection. Known methods of making cellulous ester/polyamide thin film membranes lead to the formation of macrovoids, too-large pores, and other membrane vulnerabilities.

Figure 3:
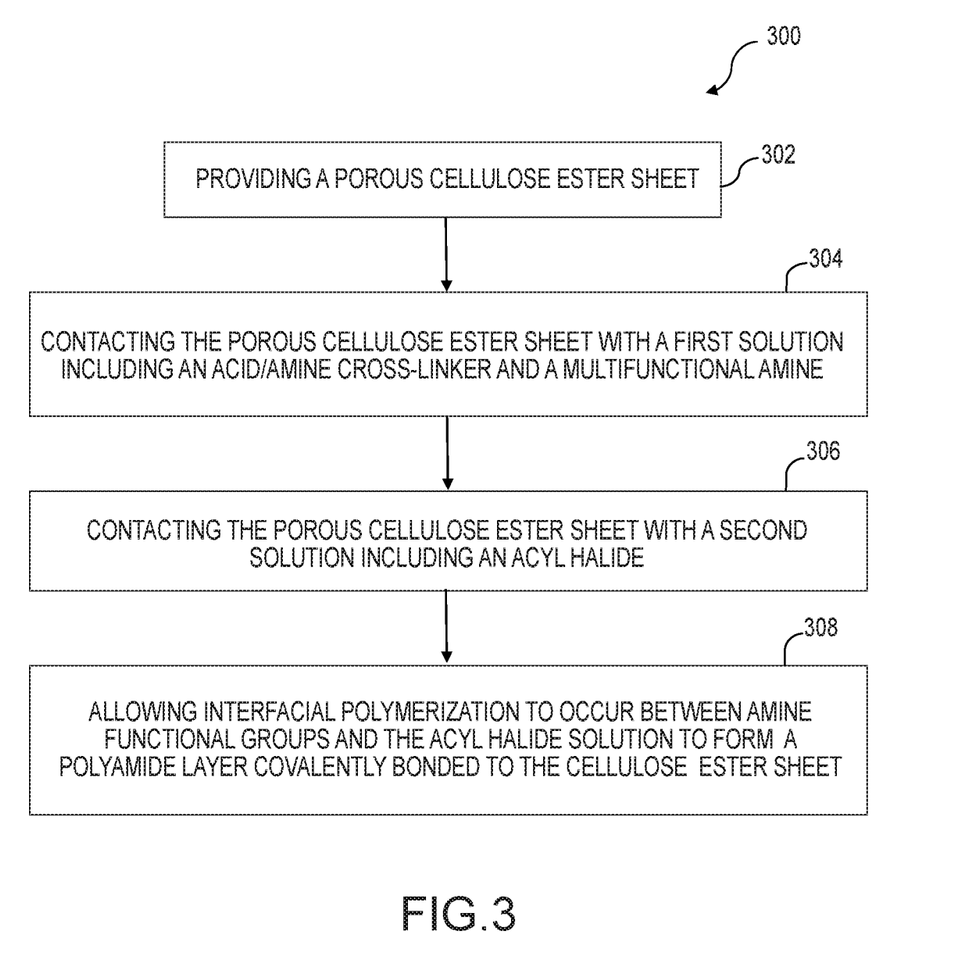
FIG. 3 is a flow chart illustrating a method of manufacturing the membrane of FIG. 1, according to an embodiment.

FIG. 3 is a flow chart illustrating a method 300 of manufacturing the membrane 100 of FIG. 1, according to another embodiment. The method 300 includes acts 302, 304, 306, 308, 310, and 312, which will be discussed in more detail below.

Act 302 includes providing a porous cellulose sheet or layer 102. The layer 102 may be formed by a method known in the art, such as a phase inversion process. The porous cellulose layer 102 may be hydrated as part of the formation process or separate from the formation process.

Act 304 includes contacting the porous cellulose layer 102 with a first solution including an acid/amine cross-linker and a multifunctional amine. The solution may be an aqueous solution. The acid/amine cross-linker may be 1-ethyl-3-3-(3-dimethylaminopropyl)carbodiimide hydrochloride ("EDC") and the multifunctional amine may be m-phenylenediamine ("MPD") orp-phenylenediamine ("PPD").

The EDC, or other acid/amine cross-linker, and MPD, PPD, or other multifunctional amine, react with free ester groups, such as from malate residues, to form acid-amine sites on the surface of the porous cellulose layer 102 as shown in the reaction below:

In act 304, acid-amine sites are also formed in the pores of the porous cellulose layer 102.

Act 306 includes contacting the porous cellulose layer 102 with a second solution including an acyl halide. The acyl halide may be an acid chloride, such as 1,3,5-trimesoyl chloride ("TMC"), which may be dissolved in an organic solvent such as hexane or an isoparaffinic fluid (e.g., Isopar™, Exxon Mobil, Spring, TX).

Act 306 may also include removing water from the surface of the porous cellulose layer 102 prior to contacting the layer 102 with the acyl halide solution.

Act 308 includes allowing interfacial polymerization to occur between the amine functional groups and the carbonyl moieties of the acyl halide solution, such as via condensation reactions, to form a polyamide layer 104. The amine functional groups are in the acid-amines sites formed on the surface of the porous cellulose layer 102 in act 302 as well as in the multifunctional amine solution in the pores of the porous cellulose layer 102. Interfacial polymerization between the acyl halide solution and amine functional groups in the multifunctional amine solution produces the bulk of the polyamide layer 104. Interfacial polymerization between the acyl halide solution and amine groups covalently bonded to the surface of the porous cellulose layer 102 in turn covalently bonds the polyamide layer 104 to the surface of the porous cellulose layer 102.

In the method 300, interfacial polymerization occurs largely at or near the surface of the porous cellulose layer 102. Some interfacial polymerization occurs within the porous cellulose layer 102.

The method 300 may be performed using the same or similar equipment as is presently used to apply a polyamide coating to a thin-film composite membrane. Repurposing of equipment to practice the method 300 may reduce manufacturing costs and production time.

Membrane Module

The membranes 100 disclosed herein may be incorporated into modules for filtration applications including reverse osmosis, forward osmosis, nanofiltration, pressure-assisted forward osmosis, and pressure-retarded osmosis. Examples of suitable modules are described in PCT/US2016/053321 and PCT/US2016/059861, which are hereby incorporated by reference in their entireties.

Figure 4A:
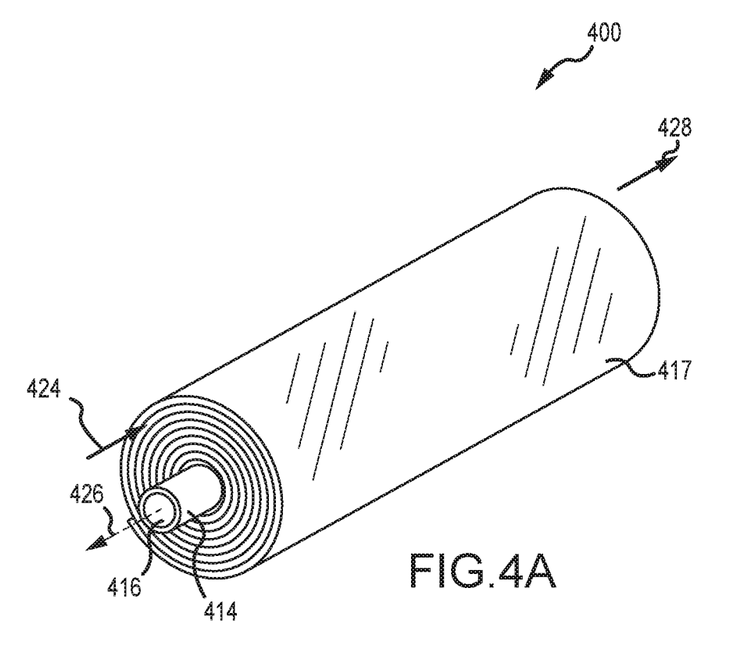
FIG. 4A is a schematic isometric view of a multi-leaf reverse osmosis membrane module including the membrane of FIG. 1, according to an embodiment.
Figure 4B:
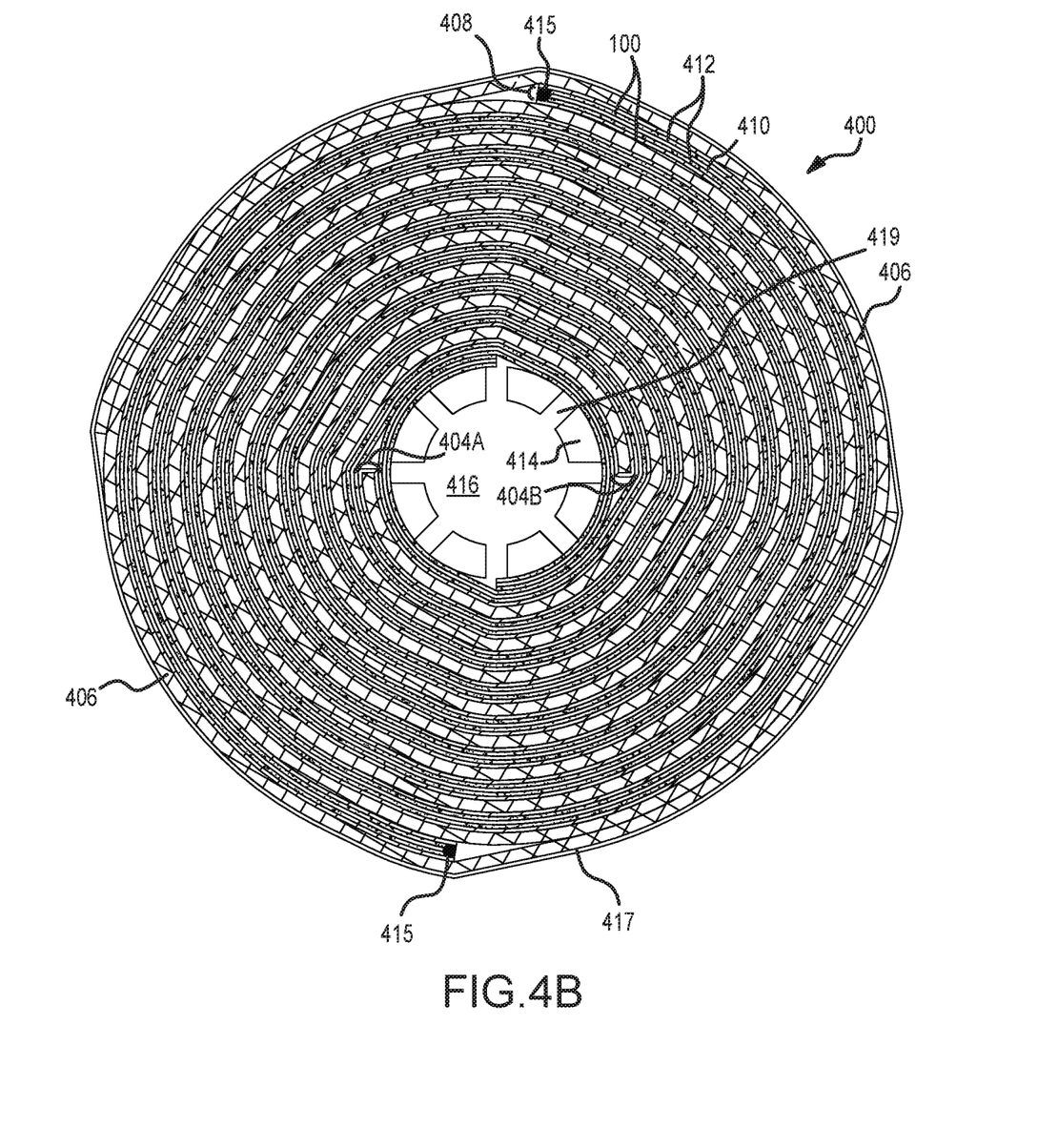
FIG. 4B is an enlarged front end view of the membrane module of FIG. 4A.

FIG. 4A is a schematic isometric view and FIG. 4B is an enlarged front end view of a spiral wound multi-leaf membrane module 400 for reverse osmosis, according to an embodiment, which incorporates any of the membranes disclosed herein.

The membrane module 400 includes a membrane sheet spiral wound about and supported by a permeate fluid flow tube 414. The permeate fluid flow tube 414 defines a permeate fluid flow channel 416 for permeate to flow therethrough.

Referring to FIGS. 4A and 4B, the membrane sheet includes two or more leaves 404A, 404B that are also referred to herein as leaves 404. The leaves 404A, 404B alternate with each other along a radial direction of the membrane module 400.

Referring again to FIG. 4B, each of the leaves 404 includes a feed spacer 406 layered with a permeate structure 408. The permeate structure 408 includes a stiffener layer 110 sandwiched between two porous permeate spacers 412, and at least one membrane 100 adjacent to a radially outermost one of the two porous permeate spacers 412. For example, for the leaf 404A, a radially outermost one of the membranes 100 is associated with the leaf 404A, while a radially innermost one of the membranes 100 adjacent to the permeate structure 408 of the leaf 404A is associated with the other leaf 404B. Stated another way, each of the leaves 404 includes one of the membranes 100 positioned radially inwardly from the corresponding feed spacer 406 thereof.

The stiffener layer 410 helps provide rigidity to the permeate structure 408, such as to facilitate spiral winding of the membrane sheet while maintaining the desired arrangement of the components of the membrane module 400. The stiffener layer 110 may be formed from a plastic sheet material. The plastic sheet material may be formed of polyvinyl chloride, chlorinated polyvinyl chloride, polypropylene, polyethylene, polystyrene, acrylic, stainless steel, copper, copper alloys, tin, tin alloys, aluminum, aluminum alloys, or combinations thereof.

The feed spacer 406 may be formed from a corrugated spacer material. For example, the feed spacers 106 may be formed from polyethylene, polypropylene, polystyrene, polyester, any other appropriate material, or combinations thereof, and may be in the form of a corrugated structure.

The porous permeate spacers 412 of the permeate structures 408 may be formed from a mesh or net made from a polymeric material, such as polyester, epoxy-coated polyester, or other plastics.

The membranes 100 are bonded to the porous permeate spacers 412 along only three sides thereof using an adhesive 415, such as a suitable glue (e.g., a polyurethane-based glue or other suitable glue). In the embodiment depicted in FIG. 4B, the side of the membranes 100 of the membrane sheet proximate to the permeate fluid flow tube 414 is not bonded to the underlying porous permeate spacers 412 thereof via the adhesive 415 so there is a free fluid path through the porous permeate spacers 412 to the permeate fluid flow tube 414 that is not obstructed by the adhesive 415.

As shown in FIG. 4B, a terminal end of each feed spacer 406 of one of the leaves 404 proximate to the permeate fluid flow tube 414 is enclosed by a membrane 100 associated with the leaf 404. For example, the terminal end of the feed spacer 406 can have the membrane 100 associated therewith wrapped around it. By enclosing the terminal end of each of the feed spacers 406, product fluid flow 424 and permeate fluid flow 426 may be prevented from mixing together and/or the product fluid flow 424 may be prevented from being pumped directly into the permeate fluid flow tube 414.

Each feed spacer 406 includes a channel in fluid communication with an adjacent permeate structure 408 to enable a portion of product fluid from the product fluid flow 424 to diffuse through the membrane 100 of an adjacent permeate structure 408 and allow the permeate to travel through the porous permeate spacers 412 of the adjacent permeate structure 408 to the permeate fluid flow tube 414.

A protective shell 417 may enclose a circumference of the spiral wound membrane sheet to hold the spiral wound membrane sheet in place, seal the circumference of the membrane module 400, and protect the components of the membrane module 400 such as the feed spacers 406 and the permeate structures 408. For example, the protective shell 417 may be formed from fiberglass or another suitable material or plastic shrink-wrapped onto the circumference of the spiral wound membrane sheet.

It should be noted that although two leaves 404 are shown in the illustrated embodiment for ease of illustration, the number of leaves 404 in the membrane modules 400 disclosed herein may vary from one embodiment to the next. For example, in other embodiments, the membrane sheet may include one leaf 404, at least three leaves 404, at least four leaves 404, at least five leaves 404, at least six leaves 404, at least seven leaves 404, at least eight leaves 404, at least nine leaves 404, at least ten leaves 404, or even twenty or more leaves 404.

The membrane module 400 may be used in a reverse osmosis application according to the following procedure. Referring again to FIGS. 4A and 4B, in operation, the product fluid flow 424 is pumped by a pump (not shown) to flow into the feed spacers 406 of the membrane module 400. The product fluid flow 424 flows through the feed spacers 406 and the channels thereof. As the product fluid flow 424 flows through the feed spacers 406, a portion of the product fluid flow 424 diffuses through an adjacent membrane 100 of an adjacent permeate structure 408 under pressure and selectively filters/separates selective chemical(s) from the product fluid flow 424 to generate the permeate fluid flow 426. The permeate fluid flow 426 flows in a spiraling path through the porous permeate spacers 412 of the adjacent permeate structure 408 along the remaining length thereof to pass through openings 419 formed in an exterior of the permeate fluid flow tube 414 that are in fluid communication with the permeate fluid flow channel 416. Thus, when the product fluid flow 424 enters one of the feed spacers 406 located radially inwardly relative to another feed spacer 406, the permeate fluid flow 426 travels a relatively shorter distance to the permeate fluid flow tube 414. The permeate fluid flow 426 flows through the openings 419 in the permeate fluid flow tube 414 and flows through and out of the permeate fluid flow channel 416 of the permeate fluid flow tube 414. The product fluid flow 424 that exits the membrane module 400 exhibits a higher concentration of the chemical(s) being filtered/separated and is referred to as concentrate fluid flow 428. The concentrate fluid flow 428 may be recirculated into the membrane module 400 as product fluid flow 424 for further filtration/separation, as desired or needed.

Figure 5A:
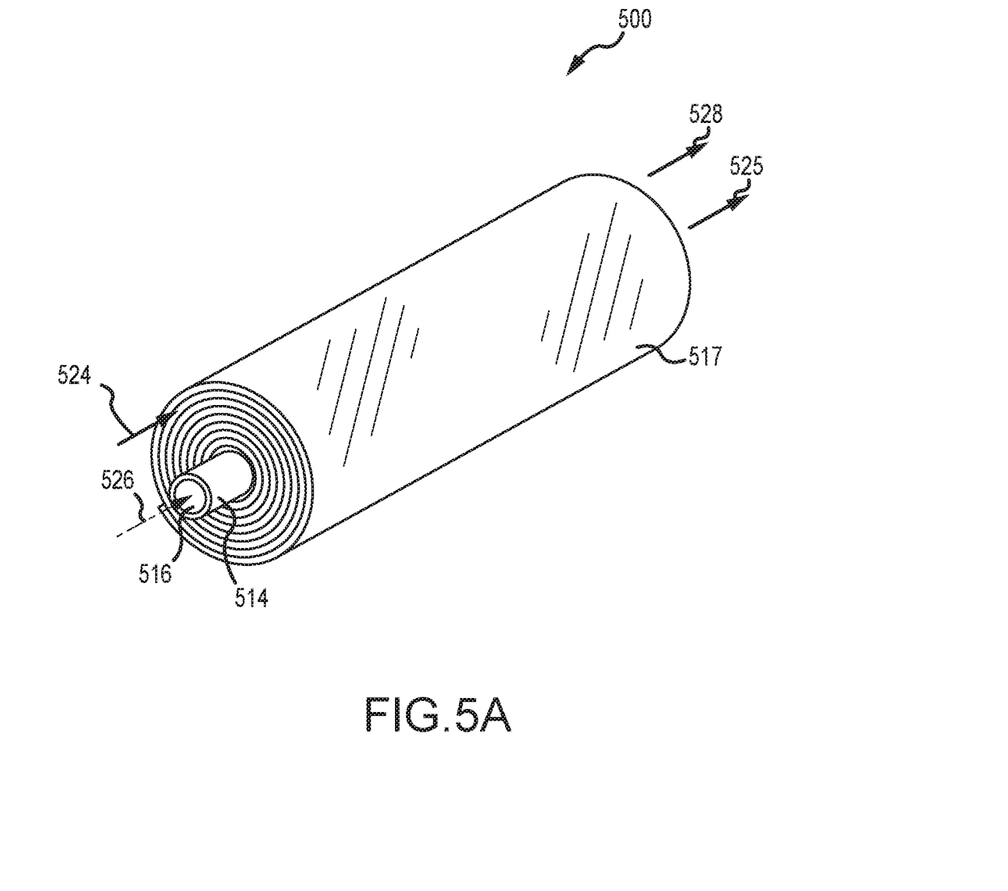
FIG. 5A is a schematic isometric view of a multi-leaf forward osmosis membrane module including the membrane of FIG. 1, according to an embodiment.
Figure 5B:
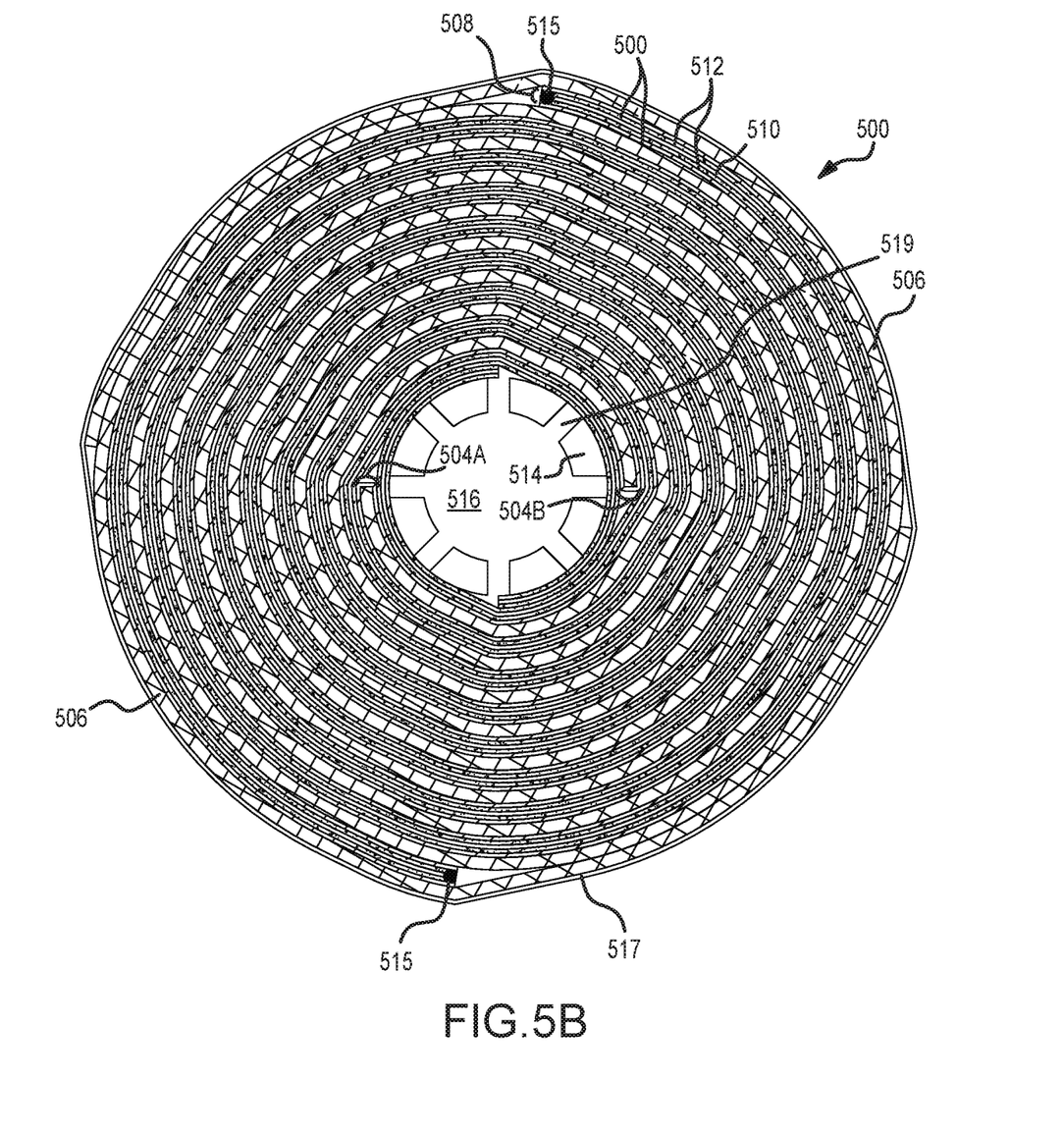
FIG. 5B is an enlarged front end view of the membrane module of FIG. 5A.

In another application, the membranes 100 disclosed herein are incorporated into membrane modules for forward osmosis. FIG. 5A is a schematic isometric view and FIG. 5B is an enlarged front end view of a spiral wound multi-leaf membrane module 500 for forward osmosis, according to an embodiment, which incorporates any of the membranes disclosed herein.

The membrane module 500 includes a membrane sheet spiral wound about and supported by a draw tube 514. The membrane sheet includes two or more leaves 504A, 504B that are also referred to herein as leaves 504. The leaves 504A, 504B alternate with each other along a radial direction of the membrane module 500.

Each of the leaves 504 includes a feed spacer 506 layered with a permeate structure 508. The permeate structure 508 includes a stiffener layer 510 sandwiched between two porous permeate spacers 512, and at least one membrane 100 adjacent to a radially outermost one of the two porous permeate spacers 512. For example, for the leaf 504A, a radially outermost one of the membranes 100 is associated with the leaf 504A, while a radially innermost one of the membranes 100 adjacent to the permeate structure 508 of the leaf 504A is associated with the other leaf 504B. Stated another way, each of the leaves 504 includes one of the membranes 100 positioned radially inwardly from the corresponding feed spacer 506 thereof.

The stiffener layer 510 helps provide rigidity to the permeate structure 508 as described above for stiffener layer 410. The feed spacer 506, permeate spacers 512, and possible number of leaves 504 are also as described above for the feed spacer 406, permeate spacer 412, and possible number of leaves 404, respectively. It should be understood that the terms "permeate structure," "permeate spacer," and other similar terms are from the reverse osmosis technology area, but are still used to describe forward osmosis membrane modules even though a permeate does not flow through the membrane sheet.

The membranes 100 are bonded to the porous permeate spacers 512 along three sides thereof using an adhesive 515A, such as a suitable glue (e.g., a polyurethane-based glue or other suitable glue). The side of the membranes 100 of the permeate structure 508 proximate to the permeate draw tube 514 is not bonded to the underlying porous permeate spacers 512 thereof via the adhesive 515 so there is a free fluid path through the porous permeate spacers 512 from the draw tube 514 that is not obstructed by the adhesive 515A.

As shown in FIG. 5B, a terminal end of each feed spacer 506 of one of the leaves 504 proximate to the draw tube 514 is enclosed by a membrane 100 associated with the leaf 504. For example, the terminal end of the feed spacer 506 can have the membrane 100 associated therewith wrapped around it. By enclosing the terminal end of each of the feed spacers 506, draw solution fluid flow 526 and feed solution fluid flow 524 may be prevented from mixing together and/or the feed solution fluid flow 524 may be prevented from being pumped directly into the draw tube 514.

A protective shell 517 may enclose a circumference of the spiral wound membrane sheet to hold the spiral wound membrane sheet in place, seal the circumference of the membrane module 500, and protect the components of the membrane module 500 such as the feed spacers 506 and the permeate structures 508. The protective shell 517 may be as constructed as described above for the protective shell 417.

Figure 6:
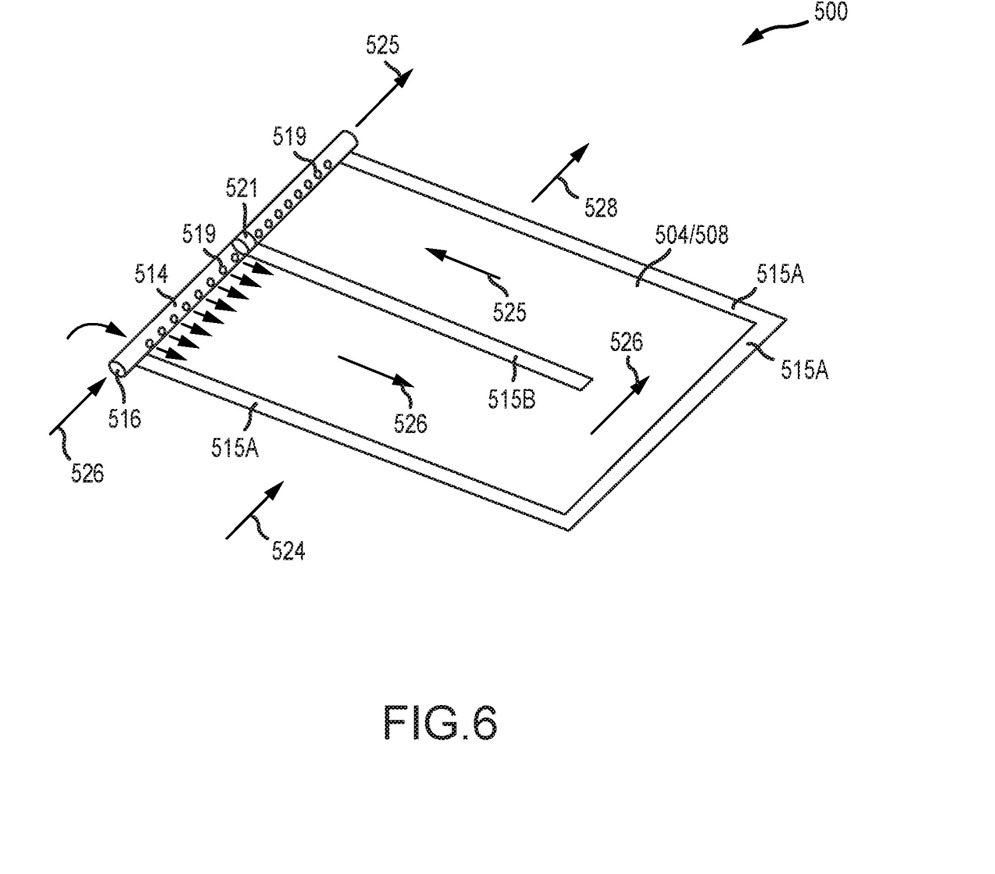
FIG. 6 is an isometric view of the membrane module of FIG. 5A, with the membrane sheet unwound to illustrate a flow path that a draw solution flows during use.

Referring to FIG. 6, a plug or barrier 521 may be disposed in a draw solution flow passageway 516 defined by the draw tube 514 that blocks draw solution fluid flow 526 through the draw tube 514 so the draw solution fluid flow 526 cannot flow completely through the draw solution flow passageway 516. Additional adhesive 515B is provided that bonds the membranes 100 to the porous permeate spacers 512. The adhesive 515B is positioned and configured to divide the porous permeate spacer 512 of the permeate structure 508 to provide a flow path for the draw solution 526 that flows into the draw tube 514, out of the openings 519 of the draw tube 514, around the adhesive 515B, through the openings 519 on the other side of the barrier 521, and out of the draw tube 514 as diluted draw solution 525.

Each feed spacer 506 includes a channel in fluid communication with an adjacent permeate structure 508 to enable a portion of the water from the feed solution fluid flow 524 to diffuse through the membrane 100 of an adjacent permeate structure 508 via forward osmosis and allow the water to mix with and dilute the draw solution fluid flow 526 and travel to and through the openings 519 in the draw tube 514 to ultimately exit from the draw tube 514 as the diluted draw solution 525. Stated another way, the water from the feed solution fluid flow 524 diffuses through the membrane 100 into the draw solution of the draw solution fluid flow 526 flowing through the adjacent porous permeate spacers 512 of the adjacent permeate structure 508 due to forward osmosis.

With reference to FIG. 5A, during forward osmosis, a feed solution fluid flow 524 including one or more salts enters a membrane module 500, where it is concentrated to form a concentrate fluid flow 528 that exits the membrane module 500. A draw solution of a draw solution fluid flow 526 is forced into the membrane module 500, where it is diluted to form a diluted draw solution 525 that exits a draw tube 514 as a diluted draw solution 525.

More specifically, and referring again to FIGS. 5A and 6, in operation, draw solution of the draw solution fluid flow 526 is pumped by a pump (not shown) or otherwise made to flow into the draw tube 514 of the membrane module 500. The draw solution fluid flow 526 flows through the draw tube 514, out of the openings 519 in the draw tube 514 on one side of the barrier 521, through the porous permeate spacers 512, and back out of the draw tube 514 via the openings 519 on the other side of the barrier 521 as the diluted draw solution 525. The feed solution fluid flow 524 flows through the feed spacers 506 and exits the membrane module 500 as concentrate fluid flow 528.

While various aspects and embodiments have been disclosed herein, other aspects and embodiments are contemplated. The various aspects and embodiments disclosed herein are for purposes of illustration and are not intended to be limiting.

What is claimed is:

1. A membrane, comprising:
   a porous cellulose layer including at least one polymer of cellulose-ester repeating groups, at least some of the cellulose-ester repeating groups including acid-amine sites bonded thereto;
   a polyamide thin film layer covalently bonded to the porous cellulose layer via carbonyl moieties interfacially polymerized to amine functional groups of the acid-amine sites of the porous cellulose layer; and
   a fabric support layer that supports the porous cellulose layer and the polyamide thin film layer;
   wherein the porous cellulose layer has pores with a pore size of about 30 nm to about 500 nm at a surface of the porous cellulose layer that is distal to the fabric support layer.

2. The membrane of claim 1, wherein the porous cellulose layer has a pore size of about 30 nm to about 2 μm at an interface between the porous cellulose layer and the fabric support layer.

3. The membrane of claim 1, wherein the cellulose-ester repeating groups include cellulose and at least one ester of at least one carboxylic acid having one carboxylic acid functional group.

4. The membrane of claim 3, wherein at least a portion of the cellulose-ester repeating groups further include at least one ester of at least one carboxylic acid having at least two carboxylic acid functional groups in addition to the at least one ester of the at least one carboxylic acid having the one carboxylic acid functional group.

5. The membrane of claim 3, wherein the at least one carboxylic acid having one carboxylic acid functional group is selected from the group consisting of acetic acid, propionic acid, butyric acid, pentanoic acid, hexanoic acid, heptanoic acid, octanoic acid, nonanoic acid, and decanoic acid.

6. The membrane of claim 4, wherein the at least one carboxylic acid having at least two carboxylic acid functional groups is selected from the group consisting of propanedioic acid, butanedioic acid, pentanedioic acid, hexanedioic acid, heptanedioic acid, octanedioic acid, nonanedioic acid, decanedioic acid, (E)-butenedioic acid, pent-2-enedioic acid, malic acid, tartronic acid, tartaric acid, aspartic acid, and glutamic acid.

7. The membrane of claim 4, wherein the at least one ester of the at least one carboxylic acid having at least two carboxylic acid functional groups includes a plurality of esters that are positioned at an interface between the porous cellulose layer and the polyamide thin film layer.

8. The membrane of claim 1, wherein the cellulose-ester repeating groups include a plurality of malate esters.

9. The membrane of claim 1, wherein the polyamide thin film layer is covalently bonded to the porous cellulose layer by contacting the porous cellulose layer with a first solution including an acid/amine cross linker, a second solution including a multifunctional amine, and a third solution including an acyl halide.

10. The membrane of claim 1, wherein the membrane includes at least one of an A value of about 0.5 L/(m²·hr·bar) to about 2 L/(m²·hr·bar), a B value of about 0.05 L/(m²·hr) to about 0.2 L/(m²·hr), or an S value of about 100 μm to about 400 μm.

11. The membrane of claim 1, wherein covalent bonds between the polyamide thin film layer and the porous cellulose layer are about 5 nm to about 60 nm apart.

12. The membrane of claim 1, wherein the pores of the porous cellulose layer have an average pore size that increases from the surface of the porous cellulose layer that is distal to the fabric support layer towards the fabric support layer.

13. A method of manufacturing a membrane, the method comprising:
  providing a porous cellulose sheet including at least one polymer of cellulose-ester repeating groups;
  contacting the porous cellulose sheet with a first solution including an acid/amine cross-linker such that the acid/amine cross-linker reacts with at least some free ester groups of the at least one polymer of cellulose-ester repeating groups effective to form acid-linker groups;
  contacting the porous cellulose sheet with a second solution including a multifunctional amine such that the multifunctional amine bonds with the acid-linker groups to form acid-amine sites on a surface of the porous cellulose sheet;
  contacting the porous cellulose sheet with a third solution including an acyl halide; and
  allowing interfacial polymerization at least in part between amine functional groups in the acid-amine sites on the surface of the porous cellulose sheet and carbonyl moieties of the acyl halide to produce a polyamide layer covalently bonded to the porous cellulose sheet.

14. The method of claim 13, wherein:
  the porous cellulose sheet includes cellulose and at least one ester of at least one carboxylic acid having one carboxylic acid functional group; and
  at least a portion of the cellulose-ester repeating groups further include at least one ester of at least one carboxylic acid having at least two carboxylic acid functional groups in addition to the at least one ester of the at least one carboxylic acid having the one carboxylic acid functional group.

15. The method of claim 13, further comprising at least one of the acid/amine cross-linker including dicyclohexylcarbodiimide, the first solution including an organic solvent, the multifunctional amine including at least one of a primary amine or phenylenediamine, the second solution being aqueous, or the third solution including an organic solvent.

16. The method of claim 13, wherein the acyl halide includes 1,3,5-trimesoyl chloride.

17. The method of claim 13, further comprising removing water from the surface of the porous cellulose sheet prior to contacting the porous cellulose sheet with the first solution including the acid/amine cross-linker.

18. The method of claim 13, further comprising allowing the acid/amine cross-linker to react with ester groups of the free ester groups on the surface of the porous cellulose sheet to form the acid-linker groups on the surface of the porous cellulose sheet.

19. The method of claim 18, further comprising allowing the multifunctional amine to react with the acid-linker groups to form the acid-amine sites on the surface of the porous cellulose sheet.

20. The method of claim 13, wherein the polyamide layer has a thickness of about 10 nm to about 300 nm.

21. The method of claim 13, wherein contacting the porous cellulose sheet with a first solution including an acid/amine cross-linker such that the acid/amine cross-linker reacts with at least some free ester groups of the at least one polymer of cellulose-ester repeating groups effective to form acid-linker groups includes:
  contacting the porous cellulose sheet with the first solution including the acid/amine cross-linker such that the acid/amine cross-linker reacts with about 5% to about 90% of the free ester groups of the at least one polymer of cellulose-ester repeating groups effective to form the acid-linker groups.

22. The method of claim 13, further comprising removing solvent from the surface of the porous cellulose sheet prior to contacting the porous cellulose sheet with the third solution.

23. The method of claim 13, further comprising removing water from the surface of the porous cellulose sheet prior to contacting the porous cellulose sheet with the third solution.

24. The method of claim 13, wherein allowing interfacial polymerization at least in part between amine functional groups in the acid-amine sites on the surface of the porous cellulose sheet and carbonyl moieties of the acyl halide to produce a polyamide layer covalently bonded to the porous cellulose sheet includes:
  allowing the interfacial polymerization at least in part between (1) the amine functional groups in the acid-amine sites on the surface of the porous cellulose sheet and the carbonyl moieties of the acyl halide and (2) the amine functional groups diffused from pores of the porous cellulose layer and the carbonyl moieties of the acyl halide to produce the polyamide layer covalently bonded to the porous cellulose sheet.

25. The method of claim 13, wherein allowing interfacial polymerization at least in part between amine functional groups in the acid-amine sites on the surface of the porous cellulose sheet and carbonyl moieties of the acyl halide to produce a polyamide layer covalently bonded to the porous cellulose sheet includes:
  allowing the interfacial polymerization at least in part between (1) the amine functional groups in the acid-amine sites on the surface of the porous cellulose sheet and the carbonyl moieties of the acyl halide and (2) the amine functional groups diffused from pores of the porous cellulose layer and the carbonyl moieties of the acyl halide to produce the polyamide layer covalently bonded to the porous cellulose sheet.

26. A method of manufacturing a membrane, the method comprising:
  providing a porous cellulose sheet including at least one polymer of cellulose-ester repeating groups;
  contacting the porous cellulose sheet with a first solution including an acid/amine cross-linker and a multifunctional amine effective to form acid-amine sites on a surface of the porous cellulose sheet;
  contacting the porous cellulose sheet with a second solution including an acyl halide; and allowing interfacial polymerization at least in part between amine functional groups in the acid-amine sites on the surface of the porous cellulose sheet and carbonyl moieties of the acyl halide to produce a polyamide layer covalently bonded to the porous cellulose sheet.

27. The method of claim 26, wherein:
the porous cellulose sheet includes cellulose and at least one ester of at least one carboxylic acid having one carboxylic acid functional group; and
at least a portion of the cellulose-ester repeating groups further include at least one ester of at least one carboxylic acid having at least two carboxylic acid functional groups in addition to the at least one ester of the at least one carboxylic acid having the one carboxylic acid functional group.

28. The method of claim 26, further comprising at least one of the acid/amine cross-linker including 1-ethyl-3-3-(3-dimethylaminopropyl) carbodiimide hydrochloride, the first solution being aqueous, the multifunctional amine including phenylenediamine, the second solution including an organic solvent.

29. The method of claim 26, wherein the polyamide layer has a thickness of about 10 nm to about 300 nm.

30. The method of claim 26, wherein contacting the porous cellulose sheet with a first solution including an acid/amine cross-linker and a multifunctional amine effective to form acid-amine sites on a surface of the porous cellulose sheet includes:
contacting the porous cellulose sheet with the first solution including the acid/amine cross-linker and the multifunctional amine effective to form the acid-amine sites on the surface of the porous cellulose sheet.

31. The method of claim 26, wherein further comprising removing water from the surface of the porous cellulose sheet prior to contacting the porous cellulose sheet with the second solution.

32. A membrane module, comprising:
a tube; and
a membrane sheet spirally wound around the tube, the membrane sheet including:
a porous cellulose layer including a polymer of cellulose-ester repeating groups and having a first surface and a second surface, at least some of the cellulose-ester repeating groups including acid-amine sites bonded thereto;
a polyamide thin film layer covalently bonded to the porous cellulose layer at the first surface via carbonyl moieties interfacially polymerized to amine functional groups of the acid-amine sites of the porous cellulose layer; and
a fabric support layer at the second surface that supports the porous cellulose layer and the polyamide thin film layer;
wherein the porous cellulose layer has pores with a pore size of about 30 nm to about 500 nm at the first surface of the porous cellulose layer.

33. The membrane module of claim 32, wherein the porous cellulose layer has a pore size of about 30 nm to about 2 μm at an interface between the porous cellulose layer and the fabric support layer.

34. The membrane module of claim 32, wherein:
the porous cellulose layer includes polymers of cellulose, at least one ester of at least one carboxylic acid having one carboxylic acid functional group, and at least one ester of at least one carboxylic acid having at least two carboxylic acid functional groups in addition to the at least one ester of the at least one carboxylic acid having the one carboxylic acid functional group;
the at least one carboxylic acid having one carboxylic acid functional group is selected from the group consisting of acetic acid, propionic acid, butyric acid, pentanoic acid, hexanoic acid, heptanoic acid, octanoic acid, nonanoic acid, and decanoic acid; and
the at least one carboxylic acid having at least two carboxylic acid functional groups includes at least one of:
being selected from the group consisting of propanedioic acid, butanedioic acid, pentanedioic acid, hexanedioic acid, heptanedioic acid, octanedioic acid, nonanedioic acid, decanedioic acid, (E)-butenedioic acid, pent-2-enedioic acid, malic acid, tartronic acid, tartaric acid, aspartic acid, and glutamic acid; or
the at least one ester positioned at an interface between the porous cellulose layer and the polyamide thin film layer.

35. The membrane module of claim 32, wherein the porous cellulose layer includes a plurality of malate esters.

36. The membrane module of claim 32, wherein the membrane module includes at least one of an A value of about 0.5 L/(m2·hr·bar) to about 2 L/(m2·hr·bar), the membrane module having a B value of about 0.05 L/(m2·hr) to about 0.2 L/(m2·hr), or the membrane module having an S value of about 100 μm to about 400 μm.

37. The membrane module of claim 32, wherein covalent bonds between the polyamide thin film layer and the porous cellulose layer are about 5 nm to about 60 nm apart.

38. The membrane of claim 32, wherein the pores of the porous cellulose layer have an average pore size that increases from the first surface towards the fabric support layer.

* * * * *